(12) United States Patent
Kwong Hin Sang

(10) Patent No.: US 8,447,691 B2
(45) Date of Patent: May 21, 2013

(54) SYSTEMS AND METHODS FOR NACHA COMPLIANT ACH TRANSFERS USING AN AUTOMATED VOICE RESPONSE SYSTEM

(75) Inventor: Michael Kwong Hin Sang, Gilroy, CA (US)

(73) Assignee: HSBC Card Services, Inc., Prospect Heights, IL (US)

( * ) Notice: Subject to any disclaimer, the term of this patent is extended or adjusted under 35 U.S.C. 154(b) by 153 days.

(21) Appl. No.: 11/898,981

(22) Filed: Sep. 18, 2007

(65) Prior Publication Data

US 2008/0301021 A1 Dec. 4, 2008

Related U.S. Application Data

(60) Provisional application No. 60/940,760, filed on May 30, 2007.

(51) Int. Cl.
*G06Q 40/00* (2006.01)

(52) U.S. Cl.
USPC .................................. 705/42; 705/39; 705/44

(58) Field of Classification Search
USPC .......................................... 705/44, 26, 35, 42
See application file for complete search history.

(56) References Cited

U.S. PATENT DOCUMENTS

| | | |
|---|---|---|
| 5,345,501 A | 9/1994 | Shelton |
| 5,921,865 A | 7/1999 | Scagnelli et al. |
| 6,401,066 B1 | 6/2002 | McIntosh |
| 6,651,043 B2 | 11/2003 | Ammicht et al. |
| 6,778,644 B1 | 8/2004 | Jenkins et al. |
| 6,990,454 B2 | 1/2006 | McIntosh |
| 7,092,506 B1 | 8/2006 | Bers et al. |
| 7,123,698 B1 | 10/2006 | Clifford et al. |
| 7,130,800 B1 | 10/2006 | Currey et al. |
| 2004/0029565 A1 | 2/2004 | Shibata et al. |
| 2006/0106605 A1* | 5/2006 | Saunders et al. .............. 704/246 |
| 2008/0189209 A1* | 8/2008 | Loomis et al. .................. 705/44 |
| 2008/0195537 A1* | 8/2008 | Schulz ............................. 705/39 |
| 2008/0243690 A1* | 10/2008 | Paintin et al. .................... 705/44 |

\* cited by examiner

*Primary Examiner* — Ojo O Oyebisi

(74) *Attorney, Agent, or Firm* — Stroock & Stroock & Lavan, LLP

(57) ABSTRACT

Embodiments of the invention described a method for processing an ACH transfer in compliance with NACHA regulations. The method comprises receiving a request, through a phone call from a customer, to initiate an ACH transfer, the request including at least an account identifier and a payment amount. The method confirms the ACH transfer using speech recognition software and an interactive voice response unit, wherein the customer's identity, the date of transfer, the account identifier, the payment amount, a contact phone number, and the date of the confirmation, are confirmed by the customer using a verbal response recognized by the speech recognition software. This method also includes, recording, using a recording server, the verbal response of the customer in a sound file, tagging the sound file with at least the field of an account identifier, and storing the sound file for at least two years in a data repository.

40 Claims, 9 Drawing Sheets

FIG. 2C

| CARD | T1 |
|---|---|
| MODE | 14 |
| PCI SLOT NUMBER | 5 |
| PCI BUS NUMBER | DP6409 |
| CARD TYPE | 1271 |
| SERIAL NUMBER | |
| AUDIO FORMAT | uLAW |
| VOX RUN ON (MS) | — 5000 |
| VOX TURN ON (MS) | — 250 |
| MAX RECORD TIME (SEC) | 3600 |
| FALL BACK TIME (SEC) | 0 |
| ROLLBACK BUFFER (MILLISECONDS) | — 1000 |

216, 218, 220

TRUNK1 (222)
- FRAMING: SF
- LINE CODING: AMI
- VOX ENABLED: ☑
- PROTOCOL: NON-ISDN

TRUNK2 (224)
- FRAMING: SF
- LINE CODING: AMI
- VOX ENABLED: ☑
- PROTOCOL: NON-ISDN

FIG. 3

SYSTEMS AND METHODS FOR NACHA COMPLIANT ACH TRANSFERS USING AN AUTOMATED VOICE RESPONSE SYSTEM

CROSS-REFERENCE TO RELATED APPLICATIONS

This application claims the benefit under 35 U.S.C. 119(e) of U.S. Provisional Patent Application No. 60/940,760, filed on May 30, 2007 entitled "SYSTEMS AND METHODS FOR NACHA COMPLIANT ACH TRANSFERS USING AN AUTOMATED VOICE RESPONSE SYSTEM", which is hereby incorporated by reference herein in its entirety.

BACKGROUND OF THE INVENTION

1. Field of the Invention

The invention relates generally to NACHA compliant ACH transfers, and more specifically to making such transfers using an automated voice response system with speech recognition capabilities.

2. Description of the Related Art

Automated clearing house (ACH) transfers offers a way for consumers and businesses to transfer funds between banks and accounts in a low cost and efficient manner. ACH transfers can be used by consumers and business to make payments for many types of transactions including, paying utilities, paying credit cards, and making loan payments. ACH transfers are also used by consumers to receive direct deposit of paychecks and tax refunds among other payments. Businesses use ACH transfers extensively to pay other businesses, or to charge consumers. ACH transfers are done electronically through an electronic clearing house. One clearing house is the Federal Reserve Bank.

The manner in which ACH transfers are made is governed by the National Automated Clearing House Association (NACHA) rules and regulations. These rules ensure that senders and receivers of payments can interoperate with each other. The rules also ensure reliability and that the risk on the part of the sender and receiver is managed properly.

Consumers and businesses are able to make ACH transfers through the mail using special forms, for example, by setting up a direct deposit account. They are also able to make ACH transfers using online systems with banks and other payment processors such as PayPal. Another option for making ACH transfers is using an online web interface or other client interface to submit the transfer for processing. Yet another option is making ACH transfers over the phone with a customer care representative who can obtain the appropriate information from the caller and submit it for subsequent processing.

Although online ACH transfers are convenient and cost effective for the service provider, not everybody is comfortable using a computer or has one accessible with the proper capabilities when wanting to make an ACH transfer. However, telephones and mobile phones are ubiquitous, and therefore we have determined that what is needed is an efficient and cost effective way for consumers and businesses to make ACH transfers over the phone without having to use a customer care representative.

SUMMARY OF THE INVENTION

Embodiments of the invention described a method for processing an ACH transfer in compliance with NACHA regulations. The method comprises receiving a request, through a phone call from a customer, to initiate an ACH transfer, the request including at least an account identifier and a payment amount. The method confirms the ACH transfer using speech recognition software and an interactive voice response unit, wherein the customer's identity, the date of transfer, the account identifier, the payment amount, a contact phone number, and the date of the confirmation, are confirmed by the customer using a verbal response recognized by the speech recognition software. This method also includes recording a sound file, using a recording server, of the customer's interaction with the voice response unit, including a verbal response authorizing the ACH transfer, tagging the sound file with at least the field of an account identifier, and storing the sound file for at least two years in a data repository, allowing retrieval of the sound file based on the fields the sound file was tagged with.

In another embodiment the invention is a system for processing an ACH transfer in compliance with NACHA regulations. The system comprises a private branch exchange connecting a customer telephone to an interactive voice response unit, wherein the interactive voice response unit has speech recognition software. A recording server connected to the customer telephone through the private branch exchange, and connected to the interactive voice response unit. An ACH processing system executing a begin recording instruction, the begin recording instruction comprising at least an extension identifier for the connection to the customer telephone, wherein in response to the begin recording instruction, the recording server begins recording a sound file of the customer's interaction with the interactive voice response unit, the sound file including a verbal response interpreted by the speech recognition software as confirming the ACH transfer, and said ACH processing system executing an end recording instruction, wherein in response to the end recording instruction, the recording server stops recording the sound file. The system also has a data repository connected to the recording server for storing the sound file, wherein the sound file is linked to an account identifier for later search and retrieval of the sound file.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

FIG. 2C shows further details of how the interface to the recording server is configured.

FIG. 3 shows one embodiment of a playback interface for retrieving and listening to recorded customer calls.

DETAILED DESCRIPTION OF EMBODIMENTS OF THE INVENTION

Figure 1:
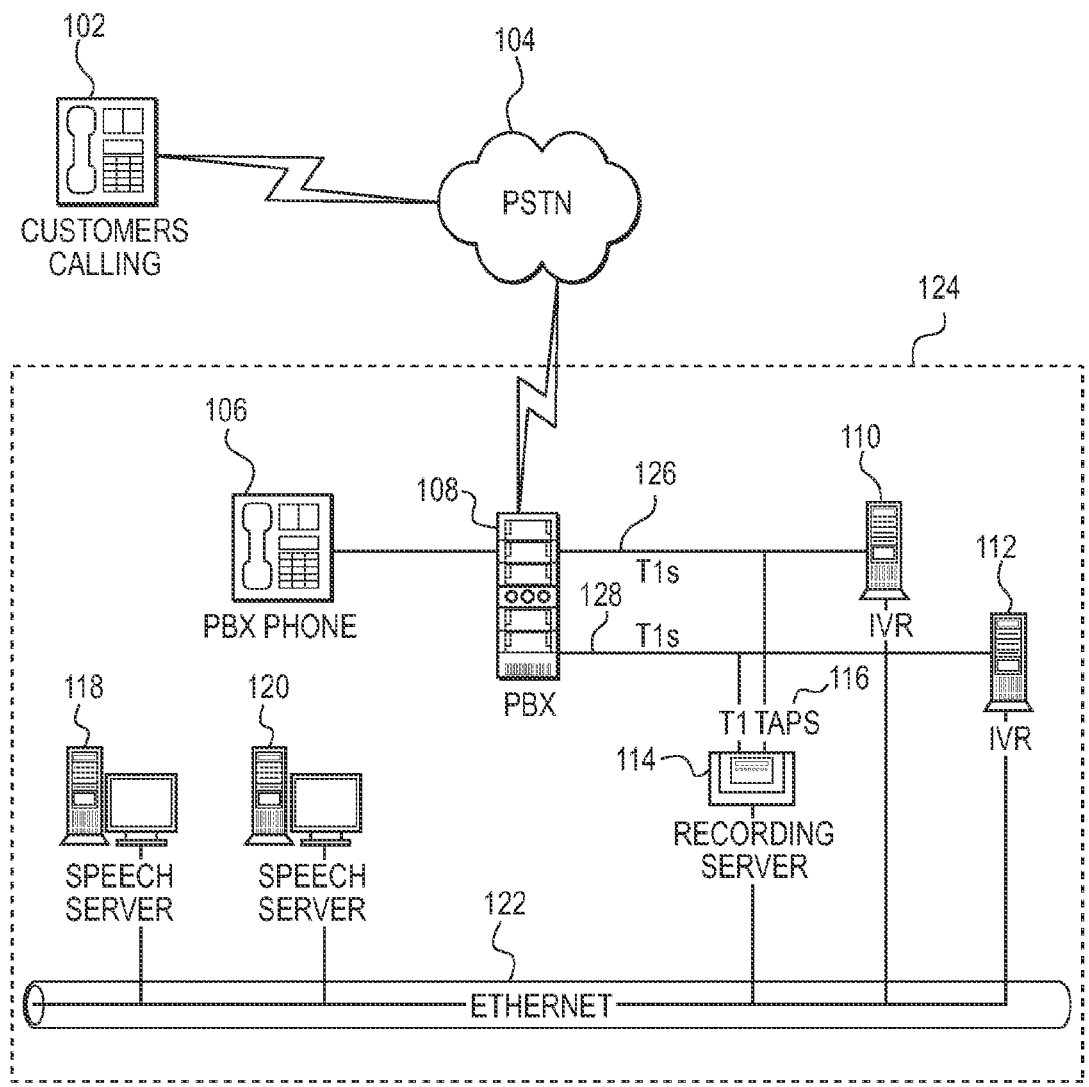
FIG. 1 is a system diagram of an ACH transfer processing system in accordance with one embodiment of the invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Embodiments of the present invention allow customers to make NACHA compliant ACH transfers over the phone using an automated system. A customer call is handled by an interactive voice response unit (IVR), which uses a series of scripted unique prompts and questions to collect the necessary information about the ACH transfer. The system then confirms the transaction while recording it, so that it complies with NACHA regulations. The use of speech recognition technology simplifies the entire process and makes interaction with the customer more natural. Confirmation can be directly confirmed by analyzing the customer's verbal response. Embodiments of the invention also record the confirmation as a sound file, allowing the confirmation to be stored. The sound file is tagged so it can be easily retrieved if verification of the transaction was ever desired. Embodiments of the system are also designed to be advantageously scalable and easily extendable to handle a larger number of simultaneous transactions, reducing the cost and improving responsiveness of the system.

There are six requirements that need to be recorded and stored before a phone based ACH debit system can be NACHA compliant. These are (1) the date on or after which the consumer's account will be debited; (2) the amount of the debit entry to the consumers account; (3) the consumer's name; (4) a telephone number that is available to the consumer and answered during normal business hours; (5) date of the oral authorization; (6) a statement by the originator that the customer's authorization will be used to originate an ACH debit to the consumer's account.

FIG. 1 shows a system diagram of a voice payment system in accordance with some embodiments of the invention. Calls from customers 102 are routed through public switched telephone network (PSTN) 104 and private branch exchange (PBX) 108 where they are handled by interactive voice response (IVR) units 110 and 112. IVRs 110 and 112 work with speech servers 118 and 120 to analyze a customer's speech. The IVRs are connected to a recording server 114, through connections 116. This system allows ACH payments to be made in a way that complies with NACHA regulations. The various components of the system are connected through a network, such as Ethernet network 122.

In detail, Customers 102 represent consumers or businesses that are calling to make ACH transfers, for example one kind of transfer is an ACH debit/phone payment. Calls can be made with any wired or wireless phone, including IP phones, that are connected to the public switched telephone network (PSTN) 104. PSTN 104 represents the telephone network to which phones 102 are connected, or to which calls are eventually routed (i.e. for IP phones). The PSTN 104 connects the customer phones 102 to private branch exchange (PBX) 108, which then connects customers call with, for example, IVRs 110 and 112, recording server 114, and PBX phone 106.

When a customer calls a particular number used for an ACH transaction in accordance with the present invention, for example an 800 number for their bank to transfer money from their account (e.g. a checking or savings account), this call is connected to PBX which routes the call to the proper application on the IVR. Different phone numbers can cause the customer to be connected to different applications on the IVR, based on DNIS passed by the PBX that identifies which toll-free 800# was dialed, for example, a different application may be for ordering more checks. Alternatively, multiple phones numbers can be routed to the same IVR, allowing both an 800 number and a regular number to connect a customer to the system.

PBX can be located at service provider site 124. Any standard PBX system can be used, for example, from Avaya. The use of standard equipment advantageously allows the system to be built cost effectively, and to be more easily integrated into a service provider's site. PBX 108 is connected to IVRs 110 and 112 through T1s 126 and 128. In other embodiments, where voice over IP (VOIP) is used instead of incoming analog calls, a IP PBX can be used to route calls.

The service provider may be a utility company, mortgage lender, or any other business that wants to receive funds from an ACH transfer. The service provider site 124 can also be a bank or other financial institution where a customer's funds are located, and that wants facilitate a customer's transfer of funds from an account to another account or payee.

In one embodiment, the service provider site 124 can also be located at a third party service providers, where the system offers hosting services, and serves as a gateway to communicate with additional third parties. The service provider allows customers of another client, for example a bank with customer accounts or a utility company with payable accounts, to offer the service of phone based ACH transfers to its customers. Customers call the third party service provider, which is connected to a plurality of financial institutions, including one at which the customer has an account. The customer can then make an ACH transfer, and the third party service provider handles the transaction, for example, by crediting the payment to the entity being paid. The third party service provider then updates balances in the customer account. Periodically, or in response to transaction, the service provider can generate additional statements for the customer detailing the transactions that the customer has completed through the provider. The service provider also communicates updates to the customer in the future. Third party service provider can also be connected to business like utilities where the customer has an account requiring payment. In this case a customer can transfer funds from a financial institution (not necessarily connected to service provider) to the business. By relying on a third party, financial institution, utilities, or any other business desiring to offer phone based ACH transfers, can easily offer this useful service to its customers in a very convenient manner.

FIG. 1 shows dual IVRs 110 and 112, dual T1s 126 and 128, and dual speech server 118 and 120. Dual systems increase reliability of the system by providing failover capability, and also allows the system to be compliant with NACHA regulations. In alternative embodiments, where a lower volume of calls is expected or reliability is not a major concern, a single T1 line, IVR 110, and speech server 118 can be used. T1 lines are a standard connection type that can each carry 24 different connections (calls) at the same time. Therefore the embodiment shown in FIG. 1 is capable of handling 48 customer calls simultaneously. As additional customer service handling capability is desired, additional T1 lines, IVRs, and speech servers can be added. Further, multiple T1 lines can be connected to a single IVR depending on its performance characteristics. Although separate components are shown for the IVR, recording server, and speech server, a single component or computer system with the proper connections and interfaces can be used to simplify the system installment and setup procedures. A second integrated component could optionally be used to provide capacity rollover and/or backup capability.

IVRs 110 and 112 are interactive voice response units capable of interfacing with customer phones 102 and handling payment transactions. IVR is a computer system with specialized software and interfaces for handling customer call. One specialized interface the IVR has is an interface for connecting to a T1 line. It executes software capable of running an interactive script that structures the call flow and menus. The IVR also has software for interfacing with speech servers 118 and 120 and recording server 116, as well as software for processing touch tone responses from customers. The interface software can be provided by the same company as the developer of the speech server. One example provider is Nuance, which can provide both speech servers, and the corresponding interface software. Alternatively, voice recognition software can be installed on the IVR instead of on the speech servers 118 and 120. The application for processing a call can be programmed using various development tools, for example, the Intervoice Invision Application Development tool if Intervoice IVRs are used.

Recording server 114 is a specialized computer system for recording and storing information from customer calls. Recording service is connected to T1 lines 126 and 128 and uses taps into those lines to record customer calls. This type of tap into the line allows customer calls to be recorded directly without the need for excessive processing, conversion, or translation. These taps are done by connecting the recording server to the T1 links through a patch panel that also connects the PBX 108 to the IVRs (see FIGS. 2A, 2B, and 2C) Recording server 114 has a large amount of storage to record all, or portions of, numerous calls for long term storage and retrieval. In accordance with NACHA regulations the recordings can be stored for 2 years or longer. Alternatively, storage of customer calls can be done using a separate storage system such as a computer dedicated exclusively for storage, a storage area network, or network attached storage. These external storage options may be used exclusively for storing customer calls, or may be more general purpose storage systems used for multiple purposes and across multiple applications.

Storage of the recordings can be done in any number of formats, however due to the large number of recordings and requirement for long term storage (at least 2 years for NACHA compliance under current rules), compressed storage formats can be advantageous. Standard and well known compressed storage format include lossy compression like MP3 (MPEG layer 3) and non-lossy compression like FLAC (free lossless audio codec). Lossless storage formats such as wav or pcm can also be used. Additionally, proprietary formats from the developer of the storage system or recording system can be used, for example, the proprietary Witness file format for a recording server made by Witness Systems.

Communication and coordination between the IVRs and the recording server can be done using a standard client server architecture. The IVRs can have a client application installed that is capable of exchanging data and instructions with a server application on the recording server 114. This can be implemented using TCP/IP and setting up a listening socket on the recording server bound to a specific port. The host name/IP address and other information of the recording server can be defined in advanced or dynamically updated using known techniques. The IVR can then send instructions and data using TCP/IP packets to that destination. Communication can take place over Ethernet 122.

During a call, as a customer is interacting with the IVR, an instruction can be sent from the IVR to the recording server to begin recording a specific call. The instruction can also contain information that "tags" the recording for later processing and retrieval. For example, along with the instruction to begin recording, the request can include the data shown below in

TABLE 1

Table 1. These fields can be added or removed as needed by other applications and business units.

| Data Field | Purpose |
| --- | --- |
| Message length | Represent the length of the message, and simplifies processing of the instruction and related data |
| IVR name | Identifies the IVR handling the call |
| IVR extension | Identifies the connection on the IVR |
| Business unit identifier | Identifies the business unit that the call is for. Allows the recording server to be used among multiple business units and applications |
| An account identifier | Identifies the account for which the transaction is being made |
| A solicitation identifier | Uniquely identifies the call. This can be used to track response to marketing efforts or solicitations. |
| Date and time identifier | Identifies the time of the transaction |
| A name | Identifies the individual |
| Phone number | Identifies the phone number from which the customer is calling |

Together these fields can uniquely identify the caller, and the call, so that they can be retrieved at a later time. Later, at an appropriate time during the call, using the IVR, an instruction (i.e. stop message event) can be sent to the recording server to stop recording the call. This instruction can include relevant information to identify the call and the transaction.

The business unit identifier allows the voice payment system to be used with other business units. With minor adjustments to the voice script, the IVR can be used for payments required by other business units, for example, mortgage payments or consumer lending payments. These different scripts can be accessed with different dial in numbers (e.g. a different 1-800 number).

In some embodiments of the invention, the IVR script can be further adapted to be used with non-payment transactions. For example, the IVR can be used within a market campaign. In response to a marketing offer, consumers can call back and sign up for a product or service. The marketing offer can be referred to by a solicitation identifier (as described above). This can be used instead of an account identifier by the IVR system to uniquely identify the caller and the transaction. The consumer's agreement to the service and fee can then be handled and recorded with the IVR system in the same manner as a payment transaction. For these types of non-payment transactions, compliance with NACHA regulations is not required. For example, fewer items of information can be recorded, and a contact phone number (instead of "800") does not need to be provide, also calls can be stored for less than two years.

This client server interface between the IVRs and the recording server can be programmed completely from scratch, or using various standard toolkits and communication protocols. One toolkit that can be used with the recording server is the commercially available advanced TCP toolkit interface from Intervoice. The toolkit can also be used for CTI functionality which allows retrieval of the phone number the customer is calling from. This data can then be easily integrated into the data sent to the recording server for tagging a customer recording.

As described above, the IVRs are speech recognition enabled systems. Therefore not only is what the customer says recorded, but the actual response is processed and used to the control the interaction with the IVR. This interaction allows the customer to easily confirm an ACH transfer. The speech recognition software can be deployed on a remote system like speech servers 118 and 120, and using a client server type architecture, speech servers can respond to sections of speech sent by the IVRs. The speech server responses can serve as the actual response, or can verify that the response received from the caller was affirmative or negative. The same software can also be integrated into IVRs 110 and 112.

The speech servers, IVRs, and/or recording servers are connected together by Ethernet network 122 or other suitable standard connection mechanism/network. Ethernet is just one popular network protocol, and it can be replaced by a different type of network capable of carrying data between computers (e.g. ATM, fiber channel). Further, TCP/IP is only one of many higher level protocols that could be carried on the network, the exact communication protocols used between the computers is not critical.

PBX phone 106 represents the phone used by a customer care representative to handle any issues and problems that cannot be resolved by the automated script running on the IVR. Customer representatives are also connected to the customer call through the PBX. In general, Customer care representatives are engaged when a customer requests live support, or there is a timeout or invalid response. The calls are queued, and transferred to an agent with a the skill set able to help with the customer's problem.

Figure 2A:
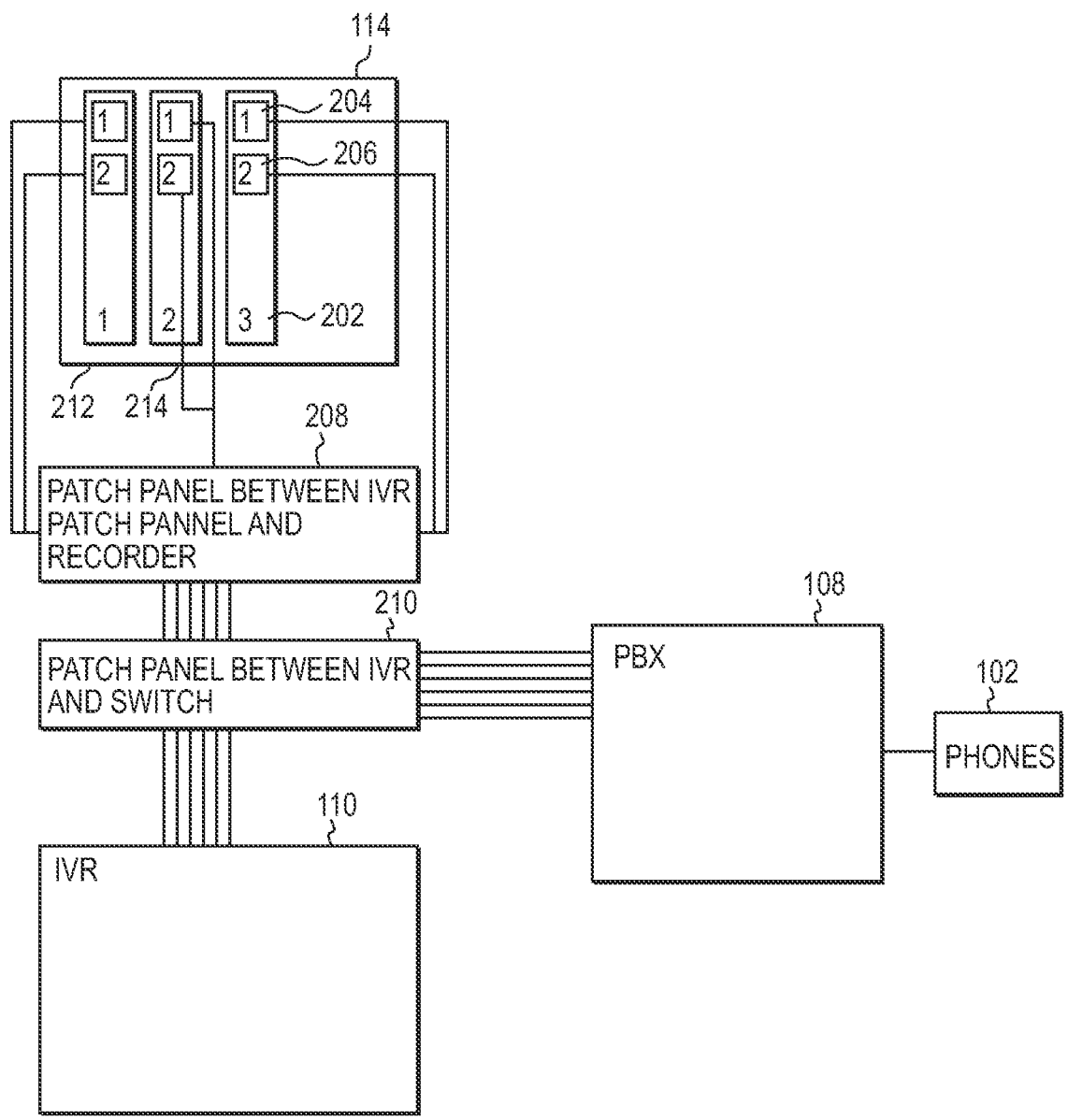
FIG. 2A shows a detailed diagram of the connection between the recording server, the IVR, and the customer.

FIG. 2A shows additional details of the connections between the IVRs, the PBX, and the recording server. The PBX 108 acts a switch and connects customer phone 102 to the rest of the system. Recording server 114 is shown with three interface cards 212, 214, and 202 installed, although more or less can be used as desired. Each interface card, such as card 202, has two ports (e.g 204 and 206) for the connection of two T1 lines. Each of these lines can carry 24 calls, therefore as shown in this embodiment, the recording server is capable of handling up to 144 call simultaneously.

Each one of the separate channels within the T1 line can be assigned a different extension number that can be used to uniquely identify the call. The recording server 114 responds to instructions from the IVR, which can contain an extension number obtained from the PBX (see Table 1, IVR extension data field). The recording server can then use a mapping function to determine which channel of the 144 channels it should be recording on based on the extension number. One possible mapping method is shown in Table 2. This type of mapping allows the recording server to determine which channel of which T1 line it should be recording on based on the extension number.

TABLE 2

| Card | Port | Channels | Start Ext. | End Ext. |
|------|------|----------|------------|----------|
| 1 | 1 | 1-24 | 1001 | 1025 |
| 1 | 2 | 25-48 | 1026 | 1050 |
| 2 | 1 | 49-72 | 1051 | 1075 |
| 2 | 2 | 73-96 | 1076 | 1100 |
| 3 | 1 | 97-120 | 1101 | 1125 |
| 3 | 2 | 121-144 | 1126 | 1150 |

For example, extension 1001 corresponds to the first channel, on first card, and on the first port. Similarly, extension 1145 would correspond to the channel 140, or the third card, the second port, and the 20th channel. Other mappings are possible, but this offers a straightforward method that can be easily extended to accommodate additional T1 lines and channels. Recording server 114 is able to tap into customer calls using patch panels 208 and 210, which provides two connections to the incoming customer line.

Other mappings can be used between the channels of the T1 line and the unique extension number used to refer to the call. For a system incorporating multiple IVRs, it is useful to have the load distributed evenly. If calls were assigned in a round robin fashion to T1 channels, then the first IVR could be completely busy, while the second IVR, handling the second T1 line, and consequently the higher extension numbers in the scheme above, could not be busy at all. One way load can be balanced is by using an automatic call distribution device. Calls can be routed evenly between multiple IVRs based on available ports, load, and whether an IVR (or specific interface card or even specific port) is currently able to handle calls. Another way the load can be balanced is to assign odd numbered channels to extension numbers starting at 1 (i.e. to the first IVR), and even numbered channels to extension number starting at 24 (i.e. to the second IVR). In this manner, calls sequentially assigned to channels would be evenly distributed between the IVRs. For example, the fifth incoming call, which would be assigned to channel 5, could be assigned an extension number of 1005. The sixth incoming call, which would be assigned to channel 6, could be assigned and extension number of 1006+24=1030.

Figure 2B:
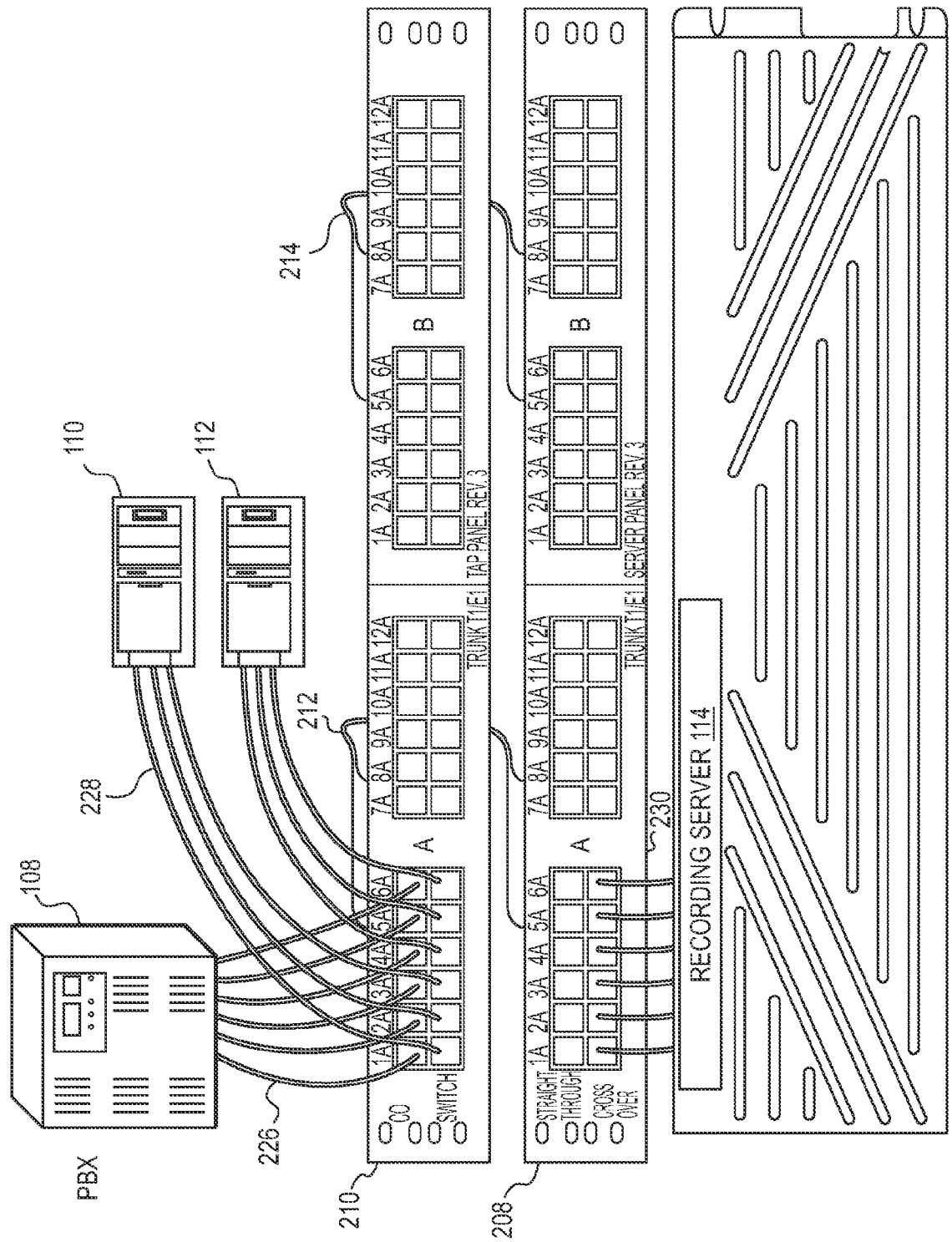
FIG. 2B shows further details of the connection between the PBX, IVR, and recording server.

FIG. 2B shows further details for the connection between the PBX 108, IVRs 110 and 112, and recording server 114. Patch panel 210 has a number of connections 226 to PBX 108 as well as a number of connections 228 to IVRs 110 and 112. The left side of patch panel 210 has 24 connections, which is equivalent to one T1 line (the right side has the same number). Each connection represents a different channel or customer call. Patch panel 210 is connected to patch panel 208 through connections 212 and 214, which link the left and right sides of patch panel 210 to the left and right sides of patch panel 208. Patch panel 208 is connected to recording server 114 through connection 230. As shown in this embodiment, a customer call from a PBX can be connected to both and IVR, and recording server, through use of an additional patch panel. This physical connection greatly simplifies recording of calls.

FIG. 2C shows further details of how the interface to the recording server is configured. This configuration is shown for a voice card that can be used to record data and convert it into a digital format that can be used by recording server. Any known and standard voice card can be used. The configuration shows that it is connected to a T1 line 216, that it is interfaced to the computer 218 through slot 14 and bus 5, and finally that the card is equipped with VOX, or voice activation features 220. Configuration for each port of the card (i.e. ports 204 and 206) is also shown. As explained above, each port can be connected to a separate T1 line.

Figure 3:
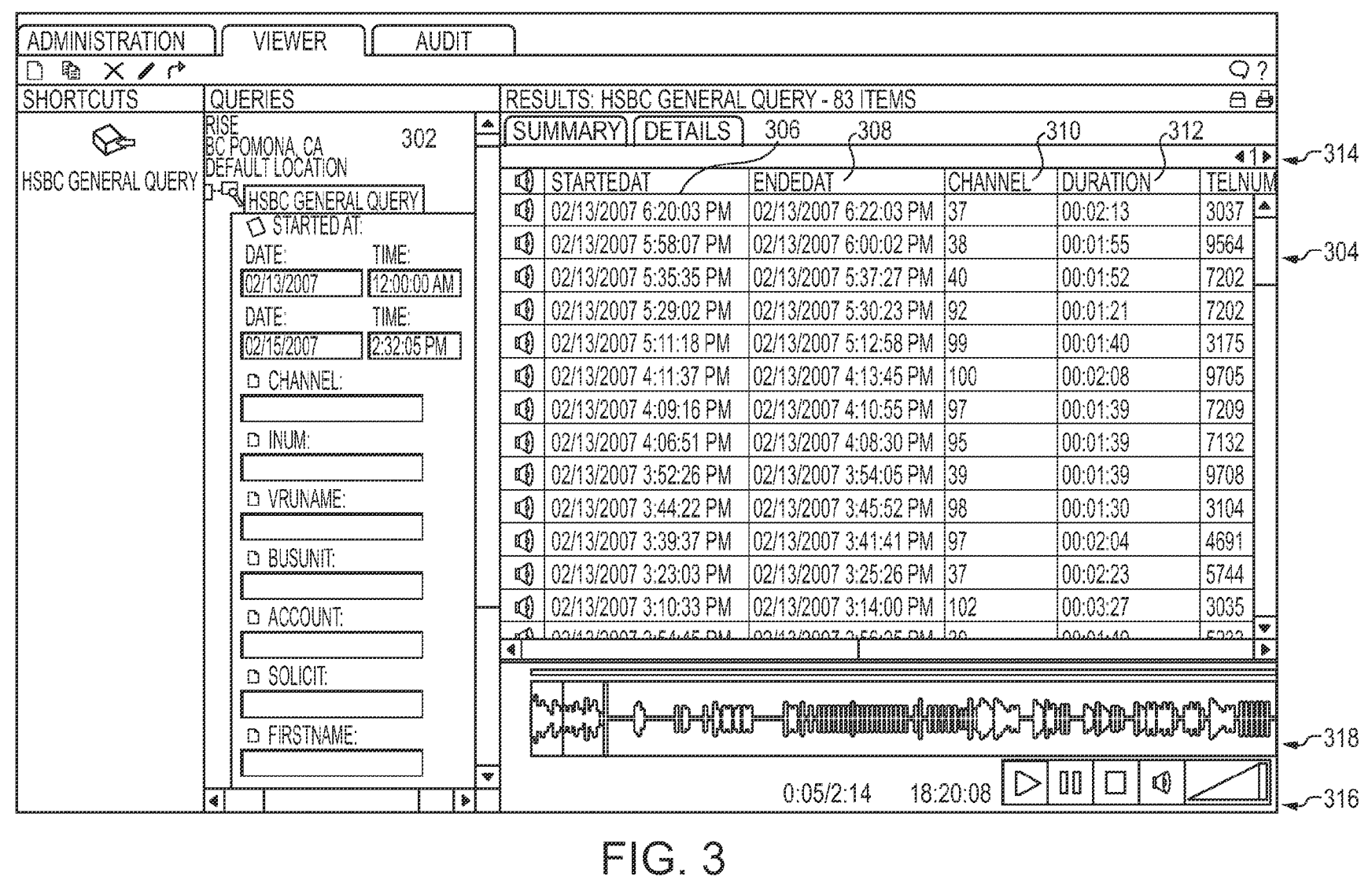

FIG. 3 shows a playback interface for retrieving and listening to the portions of customer calls that have been recorded. This interface can be implemented as a desktop or web based application that connects to a recording server where the recorded calls are stored. Alternatively, the client can connect to the storage system storing the recorded calls. As described above, when recording calls, the recording server receives an instruction from the IVR containing a number of data fields that can be used to tag a particular call for identification and storage purposes. The client interface can uses these data field to find particular calls that the user may be interested in, for example, to find a particular call of a customer to confirm that the customer did indeed give authorization to make an ACH transfer.

The interface allows the easy searching and playback of recorded calls. It can be executed on a remote management computer, recording server 114, or IVRs 110 and 112. Playback interface can also be executed directly on recording server to access locally stored files. Alternatively, playback interface can be executed remotely from the entire call center site 124. This is useful for business users located in different locations from call centers that may be handling the call. Authorization can be incorporated into the playback interface for security, and encrypted transmission like secure socket layer transmission can also be used.

The interface has a search feature 302, which allows searching for recorded calls by date and time. Calls may be recorded and stored for years within a system, therefore simply browsing though a list of calls would likely be impractical. Other fields that can be used to search include the channel field, extension number, IVR name, the business unit, the account number, the solicitation ID, the first name, and the last name. The solicitation ID can be used for marketing and tracking purposes. Customers may be contacted about the phone based payment system, and when they use it, they are requested to type in the solicitation ID of the marketing material or advertisement they are responding too. Any field with which the recording was tagged can also be used to search for the recording. The playback interface shows matching recordings in a list 304 that can be browsed through to find the exact recording the user is interested in hearing. The browse list has some or all of the field information displayed to help identify the call. In this embodiment, displayed fields are the start time 306, the end time 308, the channel 310, the duration 312, and the telephone number 314. The telephone number is included with the automatic number identification (ANI) information (i.e. called ID) passed on by the PBX.

The playback interface also has standard control buttons 316 for controlling playback of the recording, including play, stop, pause, and volume controls. Also shown is a graph 318 of the amplitude of the recording versus time. This is useful for quickly determining if there are any pauses in the recording.

Figure 4A:
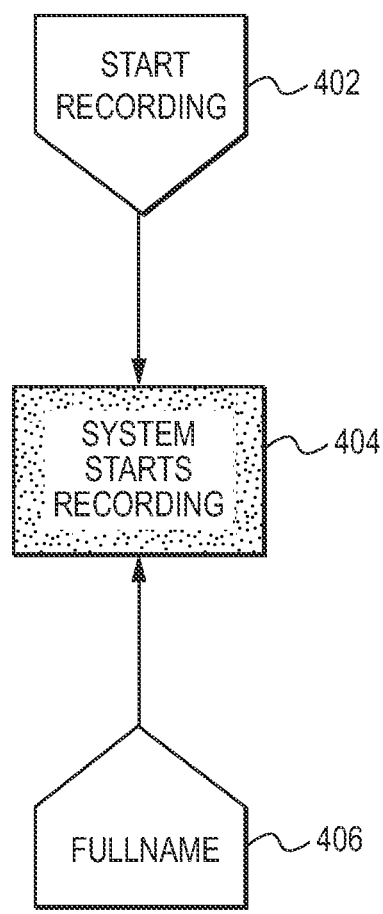
FIG. 4A shows the beginning of the call flow for recording a customer's confirmation of their ACH transfer.

FIG. 4A shows the beginning of the call flow for the portions of a call that are being recorded. The non-recorded portions relate to parts of the transaction that do not need to be recorded to ensure compliance with NACHA regulations. These parts of the call relate to the customer identifying themselves, and stating the transaction details. The customer can identify themselves either by name, or identifying number, such as an account number or social security number. The customer can also be required to confirm their identity through a password and/or personal identification number (PIN). In addition, confirmation of customer identity can also be done using speech biometrics. Customer voiceprints using speech recognition are saved, then the speech of a caller is compared with the saved voiceprints to identify a caller.

In some embodiments of the invention, calls can be recorded from the beginning, including all the voice prompts and preliminary portions of the call before the actual NACHA voice authorization. This is useful because it provides a complete account of the customer's interaction with the IVR. This additional information can be used to handle any issues the customer had with the process, and provide further support for confirmation of a transaction. In contrast to other embodiments recording only information necessary for compliance with NACHA regulations, this embodiment increases storage costs.

Once the customer is identified and authenticated, the account number, payment amount, payment date, and destination of the payment or account can be requested. The destination may simply be the operator of the system who may be a utility, mortgage lender, or other entity that is owed funds from the customer. Similarly the account providing funds can be the account at the bank the customer is calling.

Once all the information is entered, the customer is requested to confirm the details of the transaction while the system is recording. This ensures that it is compliant with NACHA regulations. The customer is requested to confirm the date on which the transfer will be made, the amount of the transaction, the customer's name, the telephone number that is available for the customer to call, the data of authorization, and a statement that the authorization if for an ACH transfer. Although not explicitly described in the call flows below, the customer can abort the transaction anytime before it has been submitted, by simply hanging up the phone. This will end the call, abort the transaction, and end any recording by the recording server.

The entire call flow is programmed using, for example, a scripting language for the interpreter software running on IVR 110 or 112. An additional grammar or script is written to understand and process the voice responses from the customer. This additional script handles response like "repeat" or "help", and also makes the system compatible with multiple languages (e.g. Spanish).

At step 402 the recording server starts recording the call. This recording process executes in response to an instruction from the IVR to begin recording, this instruction also contains additional information for tagging the call. Recording a call at this point is necessary to comply with NACHA regulations regarding ACH payments. At step 404, the actual recording of the call occurs, and at step 406 the process begins for recording a customer's full name (i.e. their identity).

Figure 4B:
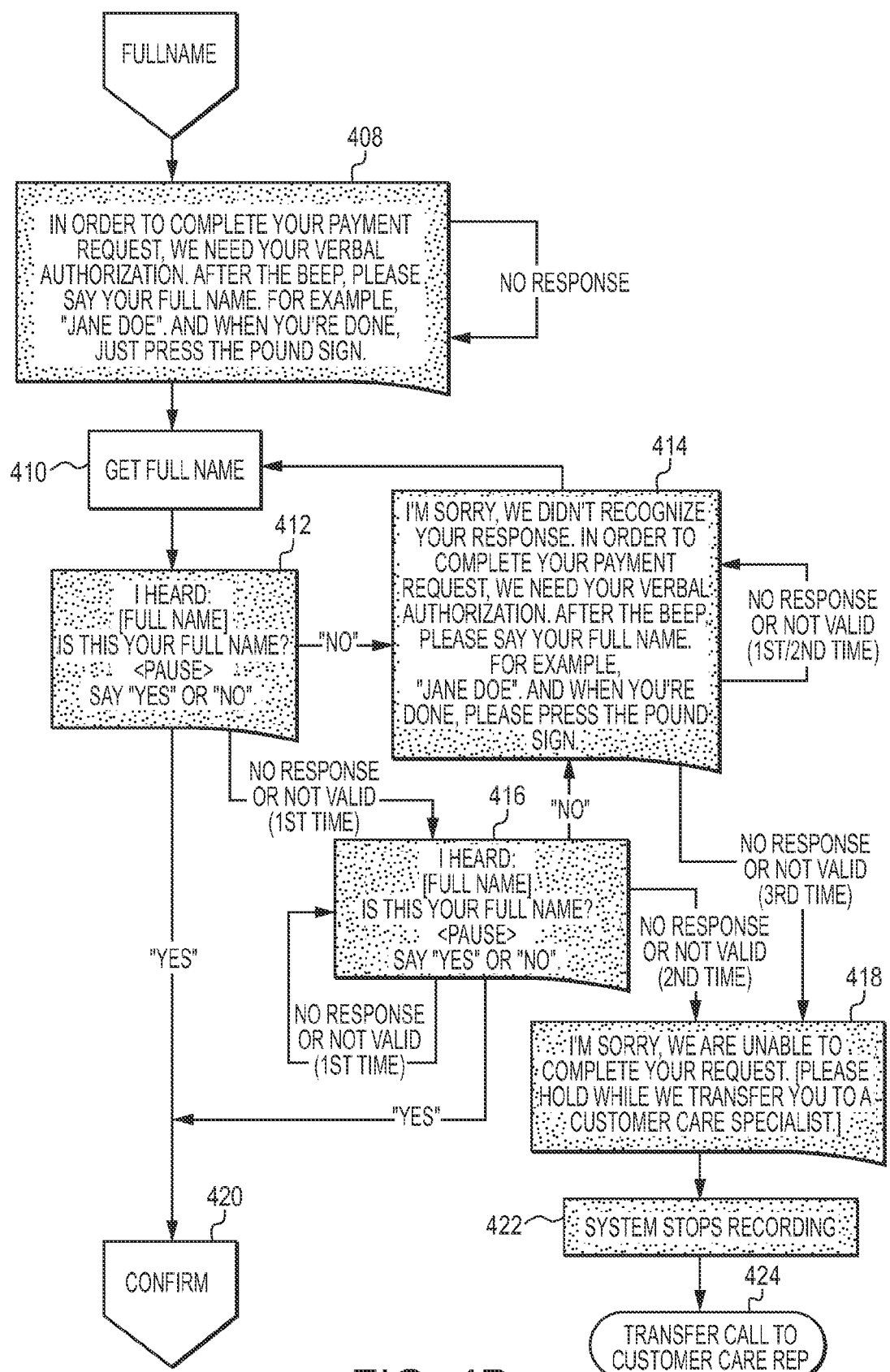
FIG. 4B shows a continuation of the call flow for recording a customer's confirmation of their ACH transfer, including confirming their identity.

FIG. 4B shows a continuation of the call flow, including confirming a customer's identity. At step 408, the IVR informs the customer that their full name is needed to continue the transaction. The message is repeated if no response is received. At step 410, the full name is retrieved and a confirmation is played for the customer at 412. If the customer confirms their name by saying "yes" or another affirmative response, the process goes to the next step. If the customers says "no", then at step 414 the IVR repeats the request for the customer's full name and the process returns back to step 410. If at step 412, there is no response or the response was not valid (i.e. not an understandable "yes" or "no"), then at step 416 the customer is asked to confirm their name. If there is no response a second time, the customer is informed that the transaction cannot be completed at step 418. At step 422, the recording server receives an instruction to stop recording from the IVR and the customer is transferred to a live customer care representative at step 424 to complete the transaction. Datapop functionality can be used to combine the customer phone number with other information so a customer care representative can easily assist the customer.

Figure 4C:
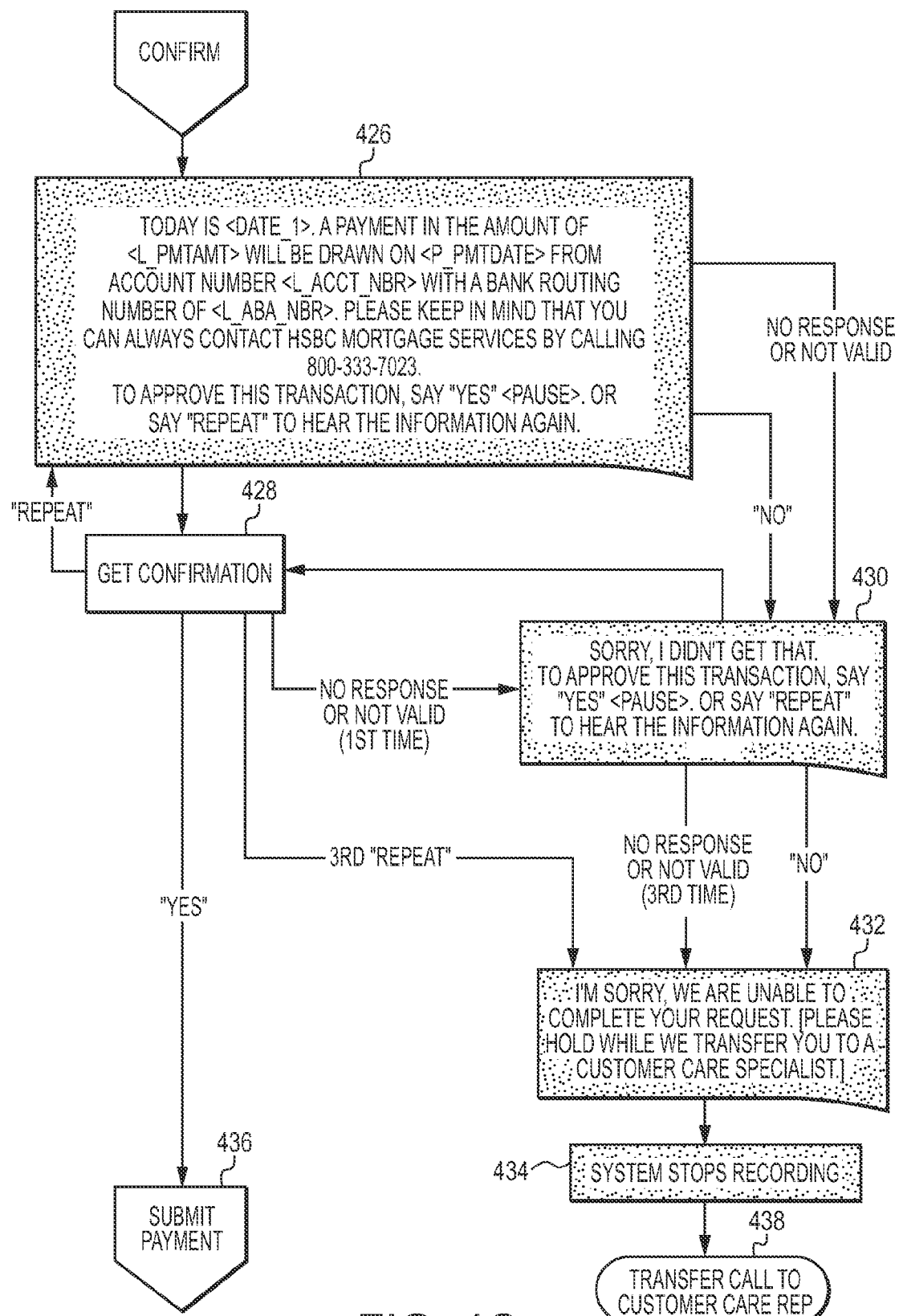
FIG. 4C shows a continuation of the call flow for recording a customer's confirmation of their ACH transfer, including confirming the transaction details.

FIG. 4C continues the process for completing the payment transaction, including confirming transaction details while a customer is being recorded. At step 426, the IVR repeats information that needs to be recorded to be NACHA compliant, including the amount of the payment, the date the transfer, the account number and routing number of the account the funds will be transferred from, and a contact number available during normal business hours that they can call. In at least one embodiment, this information was collected earlier in the call before recording began. In alternative embodiments, the entire call can be recorded, however limiting recording limits the storage necessary and makes it easier to confirm the important details of the transaction. The system then asks the customer to approve the transaction by saying "yes" or "no". At step 428, the confirmation is requested. If the customer asks the message to be repeated the process goes back to step 426 and the transaction details are repeated for the customer. At step 428, if a "yes" response is received to the payment details, then the payment is submitted for execution at step 436. The customer's response completes the list of items that need to be recorded for a NACHA compliant transfer. If a "no" response is received, the customer gets a second chance to confirm their transaction at 430. A second "no" response aborts the transaction, and the customer is informed of this at step 432. The recording server stops recording at 434, and the customer is transferred to a customer care representative so the reason that the customer canceled the transaction can be determined and resolved if possible.

Similar steps are followed at 428 if no response is received from the customer in response to the request for confirmation. The first lack of response receives a statement from the IVR at step 430 allowing the customer to respond. This provides proper error handling and graceful error recovery, giving a better overall experience to the customer. The second lack of response results in the transaction being aborted at step 432, and transfer of the customer to a customer care representative at 438. Recording of the customer call stops at step 434.

Figure 4D:
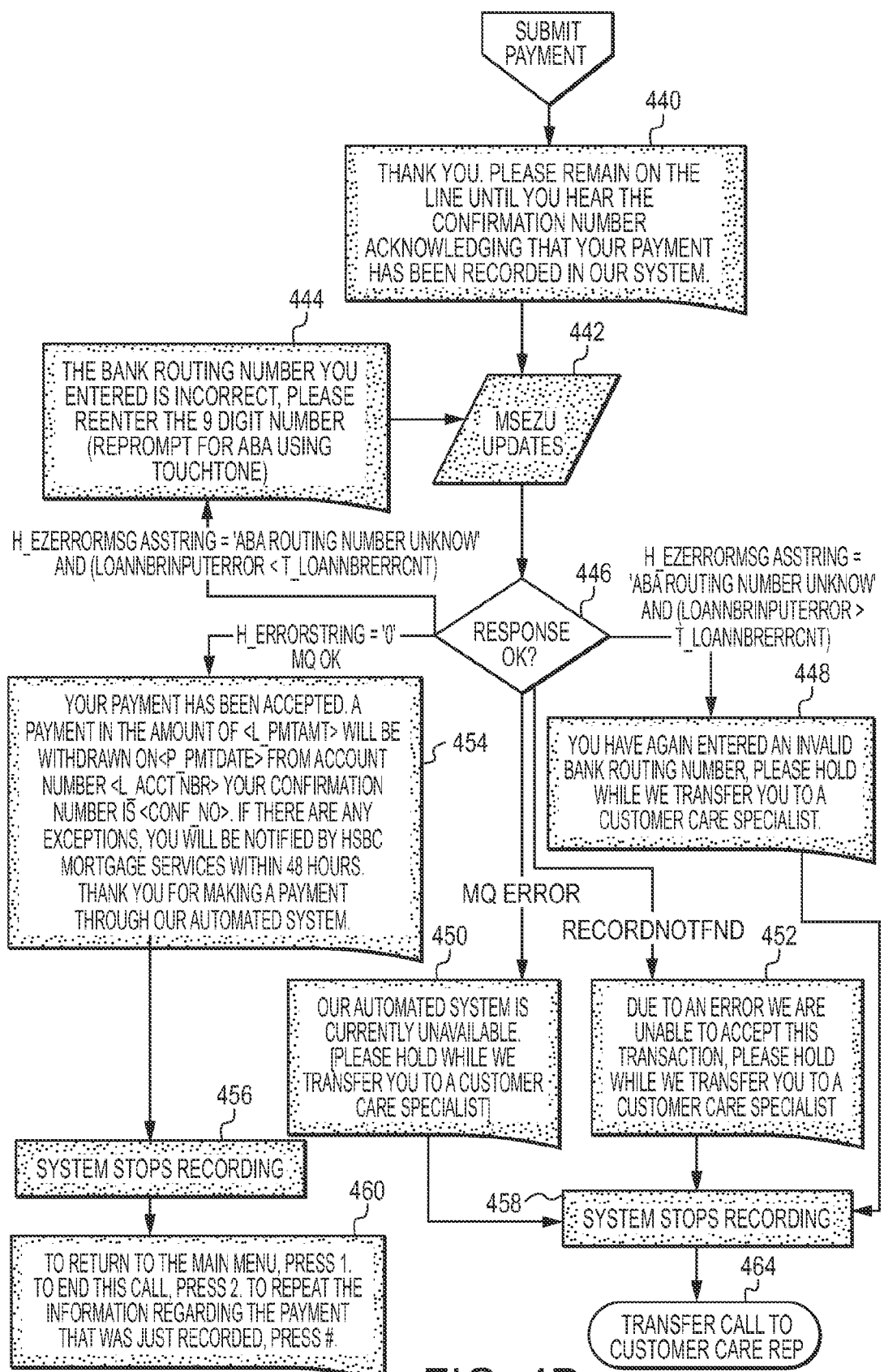
FIG. 4D shows a continuation of the call flow for recording a customer's confirmation of their ACH transfer, including receiving final confirmation of the transaction.

FIG. 4D shows further details of the call flow, including how the transaction is completed. At step 440, the customer receives a response informing them that their payment has been received and to wait for a confirmation number that can uniquely identify the transaction. At step 442, the transaction is submitted to a back end payment transaction processing system. For example, IBM MQ series system can be used to interface the middleware and backend mainframe system to update payment transactions. After completion of the transaction, a confirmation number will be provided from the backend system. At step 446, if the payment is successful, a response is received from the backend system. Then at step 454, the customer is informed that the payment was accepted and the details are again repeated for them. The transaction is complete and the recording server stops recording at step 456. At step 460, the customer can end the call or return to the main menu at 460 to begin another transaction.

In further detail, the IVR collects customer information and stores it for the back end processing. At scheduled times a mainframe retrieves the data received to that point, and formats a data file, putting it into a GDG dataset (Generation Data Group). This is one method used on mainframes to allow a group of related files to be created and referenced individually or as a group. The files are downloaded and loaded in an accounts payable system payment table. Data from this table is processed, first transactions are posted to customers accounts, and second, information is pulled from customers' accounts so that they can be transferred for processing. A daily reject file is created for those payments that could not be processed. This reject file is processed to void off payments on mainframe and the status in the accounts payable file is updated to indicate a payment reject.

If an error is received at 446, the customer is informed that the transaction cannot be processed, and recording stops at 458. The customer is then transferred to a customer care representative. A similar response is given at step 452 if the customer record cannot be found. Another error that can occur is if the customer has entered in the wrong bank routing number. This is detected by the backend processing system and an error is returned to the customer. The customer is informed at step 448 of the error and is again transferred to a customer service representative.

In alternative embodiment, instead of referring a customer to a customer care representative the transaction can be canceled, and the customer can retry it using the automated system.

Other embodiments, extensions and modifications of the ideas presented above are comprehended and within the reach of one versed in the art upon reviewing the present disclosure. Accordingly, the scope of the present invention in its various aspects should not be limited by the examples and embodiments presented above. The individual aspects of the present invention and the entirety of the invention should be regarded so as to allow for such design modifications and future developments within the scope of the present disclosure. The present invention is limited only by the claims that follow.

What is claimed is:

1. A method for processing an ACH payment request in compliance with NACHA regulations comprising:
    (a) receiving a request, through a phone call from a customer, to initiate an electronic ACH payment authorization of an electronic ACH payment for at least one of a utility bill, credit card bill, and a mortgage loan payment, the request including at least an account identifier and a payment amount;
    (b) instructing, responsive to predetermined programming, whether to record the electronic ACH payment authorization including the customer's verbal interaction with an interactive voice response unit and preliminary portions of the phone call at least one of before the electronic ACH payment authorization and during the electronic ACH payment authorization;
    (c) initiating recording of the customer's verbal interaction with the interactive voice response unit in response to a first instruction from the interactive voice response unit;
    (d) recording and confirming the electronic ACH payment authorization using speech recognition software configured to recognize verbal responses of the customer, and the interactive voice response unit;
        wherein the customer's identity, a date of the electronic ACH payment, the payment amount, a contact phone number, a verbal statement that the authorization is for the electronic ACH payment, and a date of the confirmation of the electronic ACH payment authorization are recorded and confirmed;
        wherein the recording comprises recording a sound file, using a recording server, of the customer's verbal interaction with the voice response unit;

and wherein the confirming comprises requesting, by the interactive voice response unit, that the customer provide a verbal confirmation of the electronic ACH payment authorization, and confirming, using the verbal responses recognized by the speech recognition software, the customer's identity, the date of the electronic ACH payment, the payment amount, the contact phone number, the date of the confirmation, and the authorization of the electronic ACH payment;

(e) ending the recording of the customer's verbal interaction with the voice response unit in response to a second instruction from the interactive voice response unit;

(f) tagging the sound file with at least the field of an account identifier;

(g) storing the sound file for at least two years in a data repository, allowing retrieval of the sound file based on the fields the sound file was tagged with;

(h) initiating the electronic ACH payment through a NACHA clearinghouse in accordance with the customer's confirmed ACH payment request information;

(i) collecting customer information by the interactive voice response unit and storing the customer information for back end processing;

(j) formatting the customer information and generating at least one customer file; and (k) and transmitting the customer files to an accounts payable system for processing and posting to customers' accounts in an account payable file.

2. The method of claim 1, wherein the instruction from the interactive voice response unit to the recording server to initiate recording includes a unique extension identifier and the account identifier.

3. The method of claim 1, further comprising obtaining the telephone number of the phone call from the customer using computer telephony integration.

4. The method of claim 1, further comprising tagging the sound file with at least one of the interactive voice response unit name, a business unit code, a first name, a last name, an account identifier, the telephone number of the phone call from the customer, and a unique extension identifier.

5. The method of claim 1, further comprising tagging the sound file with the date and time of the customer request.

6. The method of claim 1, wherein recording of the verbal interaction of the customer is accomplished by tapping the connection between the customer and the interactive voice response unit.

7. The method of claim 1, further comprising assigning a unique extension identifier to the phone call; and
wherein the instruction from the interactive voice response unit to the recording server to initiate recording includes the unique extension identifier.

8. The method of claim 7, wherein the recording server maps the unique extension identifier to a single phone line, and initiates recording on the single phone line.

9. The method of claim 1, wherein the phone call is routed to the interactive voice response unit in accordance with a load balancing method of an automatic call distribution system.

10. A system for processing an electronic ACH payment for at least one of a utility bill, credit card bill, and a mortgage loan payment in compliance with NACHA regulations comprising:

a private branch exchange connecting a customer telephone to an interactive voice response unit, wherein the interactive voice response unit has speech recognition software;

a recording server connected to the customer telephone through the private branch exchange, and connected to the interactive voice response unit;

an ACH processing system configured to first instruct the recording server, responsive to predetermined programming, whether to record an electronic ACH payment authorization by the customer including the customer's verbal interaction with the interactive voice response unit and preliminary portions of the phone call at least one of before the electronic ACH payment authorization and during the electronic ACH payment authorization;

the ACH processing system further configured to execute an initiate recording instruction, the initiate recording instruction comprising at least an extension identifier for the connection to the customer telephone, wherein in response to the initiate recording instruction, the recording server initiates recording a sound file of the customer's verbal interaction with the interactive voice response unit, the sound file including a verbal response interpreted by the speech recognition software as confirming an electronic ACH payment request, wherein the customer's identity, a date of the electronic ACH payment, the payment amount, a contact phone number, a verbal statement that the authorization is for the electronic ACH payment, and a date of the confirmation of the electronic ACH payment authorization are recorded and confirmed;

the ACH processing system configured to then execute an end recording instruction after the recording and confirming of the electronic ACH payment request has been completed, wherein in response to the end recording instruction, the recording server stops recording the sound file;

a data repository connected to the recording server for storing the sound file, wherein the sound file is linked to an account identifier for later search and retrieval of the sound file;

the ACH processing system configured to initiate the electronic ACH payment through a NACHA clearinghouse in accordance with the customer's confirmed electronic ACH payment request information;

the interactive voice response unit configured to collect customer information and store the customer information for back end processing; and the ACH processing system configured to format the customer information, generate at least one customer file, and transmit the at least one customer file to an accounts payable system for processing and posting to an account of the customer in an account payable file.

11. The system of claim 10, further comprising obtaining a customer telephone number using computer telephony integration.

12. The system of claim 10, where the initiate recording instruction further comprises: at least one of the interactive voice response unit name, a business unit code, a first name, a last name, an account identifier, a customer telephone number, and the extension identifier.

13. The system of claim 10, further comprising tagging the sound file with the date and time of the customer request.

14. The system of claim 10, further comprising tagging the sound file with at least one of the interactive voice response unit name, a business unit code, a first name, a last name, an account identifier, a customer telephone number, and the extension identifier.

15. The system of claim 10, wherein the data repository is located on the recording server.

16. The system of claim 10, further comprising a search interface for searching through a plurality of recorded sound files stored in the data repository.

17. A system for processing an electronic ACH payment for at least one of a utility bill, credit card bill, and a mortgage loan payment in compliance with NACHA regulations comprising:
- a means for connecting a customer telephone to an interactive voice response unit, wherein the interactive voice response unit has speech recognition software;
- a means for recording a customer call connected to the customer telephone through the means for connecting a customer telephone, the means for recording the customer call being connected to an interactive voice response unit;
- a means for obtaining the phone number of the customer call;
- an ACH processing system configured to first instruct the means for recording, responsive to predetermined programming, whether to record an electronic ACH payment authorization by the customer including the customer's verbal interaction with the interactive voice response unit and preliminary portions of the phone call at least one of before the electronic ACH payment authorization and during the electronic ACH payment authorization;
- the ACH processing system further configured to execute an initiate recording instruction comprising at least an extension identifier, wherein in response to the initiate recording instruction, the means for recording a customer call initiates recording a sound file of the customer's verbal interaction with the voice response unit, the sound file including a verbal response interpreted by the speech recognition software as confirming an electronic ACH payment request, wherein the customer's identity, a date of the electronic ACH payment, the payment amount, a contact phone number, a verbal statement that the authorization is for the electronic ACH payment, and a date of the confirmation of the electronic ACH payment authorization are recorded and confirmed;
- the ACH processing system configured to then execute an end recording instruction after the recording and confirming of the electronic ACH payment request has been completed, wherein in response to the end recording instruction the means for recording the customer call stops recording the sound file;
- a means for storing data connected to the means for recording a customer call, where the means for storing data stores the sound file, wherein the sound file is linked to an account identifier for later search and retrieval of the sound file;
- a means for finding a customer call from a plurality of recorded sound files in the means for storing data;
- the ACH processing system configured to initiate the electronic ACH payment through a NACHA clearinghouse in accordance with the customer's confirmed electronic ACH payment request information;
- the interactive voice response unit configured to collect customer information and store the customer information for back end processing; and
- the ACH processing system configured to format the customer information, generate at least one customer file, and transmit the at least one customer file to an accounts payable system for processing and posting to an account of the customer in an account payable file.

18. The system of claim 17, further comprising tagging the sound file with the date and time of the customer request.

19. The system of claim 17, further comprising tagging the sound file with at least one of the interactive voice response unit name, a business unit code, a first name, a last name, an account identifier, a customer telephone number, and the extension identifier.

20. The system of claim 17, wherein the means for storing data is located on the means for recording a customer call.

21. The method of claim 1, further comprising presenting to the customer a statement regarding the purpose of the verbal authorization.

22. The method of claim 1, wherein a call flow of the customer's verbal interaction with the interactive voice response unit is defined using a scripting language.

23. The method of claim 1, further comprising storing the sound file in a compressed file format, wherein the file format is at least one of MPEG layer 3 and free lossless audio codec.

24. The method of claim 1, the data repository further comprising a client interface for playing back a sound file and for searching for a sound file using tags.

25. The method of claim 1, further comprising confirming the customer's identity over the phone using speech biometrics, and storing customer voiceprints in a data repository accessible to the interactive voice response unit over an electronic communication network.

26. The method of claim 1, further comprising submitting the ACH payment request to a back end payment transaction processing system, and receiving a confirmation number in response to the electronic ACH payment being successfully executed.

27. The method of claim 1, further comprising transferring the customer to a customer care representative in response to a customer entering an invalid bank routing number at least one time.

28. The method of claim 1, further comprising:
- tagging the sound file with at least one of a plurality of tags, comprising: a channel field, an extension number, an IVR name, a business unit, a solicitation ID, a first name, and a last name; and
- sending the sound file to a client interface located remotely at a different call center than the data repository for play back using an encrypted communication protocol, and enabling remote searching and browsing through a plurality of the sound files using at least one of the tags.

29. The system of claim 10, further comprising presenting to the customer a statement regarding the purpose of the verbal authorization.

30. The system of claim 10, wherein a call flow of the customer's verbal interaction with the interactive voice response unit is defined using a scripting language.

31. The system of claim 10, further comprising storing the sound file in a compressed file format, wherein the file format is at least one of MPEG layer 3 and free lossless audio codec.

32. The system of claim 10, the data repository further comprising a client interface for playing back a sound file and for searching for a sound file using tags.

33. The system of claim 10, further comprising confirming the customer's identity over the phone using speech biometrics, and storing customer voiceprints in a data repository accessible to the interactive voice response unit over an electronic communication network.

34. The system of claim 10, further comprising submitting the electronic ACH payment request to a back end payment transaction processing system, and receiving a confirmation number in response to the electronic ACH payment being successfully executed.

35. The system of claim 1, further comprising transferring the customer to a customer care representative in response to a customer entering an invalid bank routing number at least one time.

36. The system of claim 1, further comprising:
tagging the sound file with a plurality of tags, comprising:
a channel field, an extension number, an IVR name, a business unit, a solicitation ID, a first name, and a last name; and
sending the sound file to a client interface for play back, wherein the client interface is capable of searching for, and browsing through, a plurality of sound files using at least one of the tags, and wherein the client interface is remotely located at a different call center than the data repository, and wherein an encrypted communication protocol is used to send the sound file.

37. The system of claim 1, further comprising:
a management computer system for managing the recording server, wherein the management computer system and recording server are remotely located from each other, and wherein the systems communicate using an encrypted communication protocol.

38. A method for processing an ACH transfer in compliance with NACHA regulations comprising:
receiving an identification request from a customer including at least one of a name and an identifying number, and at least one of an account number and a social security number;
transmitting a request for confirmation to the customer;
receiving a confirmation from the customer to confirm their identity through at least one of password and personal identification number (PIN);
instructing, responsive to predetermined programming, whether to record the communication from the customer including all the voice prompts and preliminary portions of the call at least one of before the actual NACHA voice authorization and during the actual NACHA voice authorization;
requesting the account number, payment amount, payment date, and destination of the payment or account from the customer when the customer is identified and authenticated;
requesting an additional confirmation from the customer when the information is entered, to confirm the details of the transaction while the system is recording to provide compliance with NACHA regulations;
requesting the customer to confirm the date on which the transfer will be made, the amount of the transaction, the customer's name, the telephone number that is available for the customer to call, the date of authorization, and a statement that the authorization if for an ACH transfer;
initiating, by the recording server, to start recording the call in response to an instruction from the interactive voice response unit to begin recording, including additional information for tagging the call;
requesting via the interactive voice response unit from the customer that their full name is needed to continue the transaction, and repeating the request when no response is received;
retrieving the full name and a confirmation and playing it to the customer for review;
receiving a confirmation from the customer comprising an affirmative response and transmitting confirming transaction details to the customer;
transmitting additional information by the interactive voice response unit for recording by the recording server including the amount of the payment, the date the transfer, the account number and routing number of the account the funds will be transferred from, and a contact number available during normal business hours where they can be called;
requesting the customer to approve the transaction via voice confirmation;
transmitting the transaction information again to the customer when requested;
when the customer approves the transaction, receiving a voice confirmation from the customer with respect to the payment details, and recording the voice confirmation
when the customer approves the transaction, transmitting to the customer a response informing that the payment has been received, and generating and transmitting a confirmation number that can uniquely identify the transaction to the customer;
transmitting details of the transaction to a back end payment transaction processing system for processing when the customer approves the transaction;
when the transaction is processed successfully, receiving a confirmation number from the backend and transmitting to the customer that the payment was accepted and transmitting the details again to the customer, and terminating the recording by the recording server;
collecting the customer information by the interactive voice response unit and storing the customer information for the back end processing;
formatting the customer information and generating a group of related customer files; and
transmitting the customer files to an accounts payable system for processing and posting to customers accounts in an account payable file.

39. A method for processing a transaction comprising:
receiving a request, through a phone call from a customer, to initiate an electronic transaction authorization of an electronic payment for at least one of a product and a service in response to a market offer, the request including at least a solicitation identifier associated with the market offer;
instructing, responsive to predetermined programming, whether to record the electronic transaction authorization including the customer's verbal interaction with an interactive voice response unit and preliminary portions of the phone call at least one of before the electronic transaction authorization and during the electronic transaction authorization;
initiating recording of the customer's verbal interaction with the interactive voice response unit in response to a first instruction from the interactive voice response unit;
recording and confirming the electronic transaction authorization using speech recognition software configured to recognize verbal responses of the customer, and the interactive voice response unit;
wherein the customer's identity, a date of the electronic payment, the at least one of a product and a service requested, a contact phone number, a verbal statement that the authorization is for the electronic payment, and a date of confirmation of the electronic transaction authorization are recorded and confirmed;
wherein the recording comprises recording a sound file, using a recording server of the customer's verbal interaction with the voice response unit;
and wherein the confirming comprises requesting, by the interactive voice response unit, that the customer provide a verbal confirmation of the electronic transaction authorization, and confirming, using the verbal responses recognized by the speech recognition software, the customer's identity, the date of the electronic payment, the payment amount, the contact phone number, the date of the confirmation, and the authorization of the electronic payment;

ending the recording of the customer's verbal interaction with the voice response unit in response to a second instruction from the interactive voice response unit;

tagging the sound file with at least the field of a solicitation identifier;

storing the sound file in a data repository, allowing retrieval of the sound file based on the fields the sound file was tagged with;

initiating the electronic transaction in accordance with the customer's confirmed request information;

collecting customer information by the interactive voice response unit and storing the customer information for back end processing;

formatting the customer information and generating at least one customer file; and and transmitting the customer files to an accounts payable system for processing and posting to customers' accounts in an account payable file.

40. The method of claim 39, further comprising obtaining the telephone number of the phone call from the customer using computer telephony integration.

* * * * *